US009132693B2

(12) United States Patent
Klootwijk et al.

(10) Patent No.: US 9,132,693 B2
(45) Date of Patent: Sep. 15, 2015

(54) CAPACITIVE MICROMACHINE ULTRASOUND TRANSDUCER

(75) Inventors: Johan H. Klootwijk, Eindhoven (NL); Peter Dirksen, Valkenswaard (NL); Marcel Mulder, Eindhoven (NL); Elisabeth M. L. Moonen, Eindhoven (NL)

(73) Assignee: Koninklijke Philps N.V., Eindhoven (NL)

( * ) Notice: Subject to any disclaimer, the term of this patent is extended or adjusted under 35 U.S.C. 154(b) by 1218 days.

(21) Appl. No.: 13/062,744

(22) PCT Filed: Sep. 8, 2009

(86) PCT No.: PCT/IB2009/053914
§ 371 (c)(1),
(2), (4) Date: Mar. 8, 2011

(87) PCT Pub. No.: WO2010/032156
PCT Pub. Date: Mar. 25, 2010

(65) Prior Publication Data
US 2011/0163630 A1    Jul. 7, 2011

(30) Foreign Application Priority Data
Sep. 16, 2008 (EP) .................................. 08305553

(51) Int. Cl.
*H02N 1/00* (2006.01)
*B60B 1/02* (2006.01)

(52) U.S. Cl.
CPC ......... *B60B 1/0292* (2013.01); *Y10T 29/49005* (2015.01)

(58) Field of Classification Search
CPC .......... H02N 1/00; H02N 1/08; H04R 31/00; B06B 1/0292; Y10T 29/49005

USPC .................................................. 310/300, 309
See application file for complete search history.

(56) References Cited

U.S. PATENT DOCUMENTS

| 7,098,147 B2 | 8/2006 | Nansei et al. |
| 2005/0059206 A1 | 3/2005 | Chung et al. |

(Continued)

FOREIGN PATENT DOCUMENTS

| JP | 2008099036 A | 4/2008 |
| WO | 2006123299 A2 | 11/2006 |
| WO | 2007030522 A1 | 5/2007 |

*Primary Examiner* — Tran Tran

(57) ABSTRACT

The patent application discloses a capacitive micromachined ultrasound transducer, comprising a silicon substrate; a cavity; a first electrode, which is arranged between the silicon substrate and the cavity; wherein the first electrode is arranged under the cavity; a membrane, wherein the membrane is arranged above the cavity and opposite to the first electrode; a second electrode, wherein the second electrode is arranged above the cavity and opposite to the first electrode; wherein the second electrode is arranged in or close to the membrane, wherein the first electrode and the second electrode are adapted to be supplied by a voltage; and a first isolation layer, which is arranged between the first electrode and the second electrode, wherein the first isolation layer comprises a dielectric. It is also described a system for generating or detecting ultrasound waves, wherein the system comprises a transducer according to the patent application. Further, it is disclosed a method for manufacturing a transducer according to the patent application, wherein the transducer is manufactured with the help of a CMOS manufacturing process, wherein the transducer can be manufactured as a post-processing feature during a CMOS process.

15 Claims, 3 Drawing Sheets

(56) References Cited

U.S. PATENT DOCUMENTS

| | | |
|---|---|---|
| 2005/0177045 A1 | 8/2005 | Degertekin et al. |
| 2005/0234342 A1 | 10/2005 | Bayram et al. |
| 2007/0052093 A1 | 3/2007 | Machida et al. |
| 2007/0056925 A1 | 3/2007 | Liu et al. |
| 2007/0180916 A1 | 8/2007 | Tian et al. |
| 2008/0089180 A1 | 4/2008 | Matsumoto et al. |

CAPACITIVE MICROMACHINE ULTRASOUND TRANSDUCER

FIELD OF THE INVENTION

The present invention relates to a capacitive micromachined ultrasound transducer, a system for generating or detecting ultrasound waves and a method for manufacturing a transducer.

BACKGROUND OF THE INVENTION

A capacitive micromachined ultrasound transducer (CMUT) is essentially a parallel plate capacitor. The top electrode is embedded in a membrane. An RF-voltage across the electrodes makes the membrane vibrate, typically at a few MHz. Capacitive micromachined ultrasound transducers are known for high efficiency and high output power.

SUMMARY OF THE INVENTION

However, charging is a known disadvantage of capacitive micromachined ultrasound transducers of the prior art and often prevents its practical implementation. Due to charging the transducer may be unstable and its characteristics may drift.

Therefore, it is desirable to provide an improved transducer and method for solving the charging problem. The solution of the charging problem according to the inventive concept will lead to a capacitive micromachined ultrasound transducer, which can be used for various applications, because of its independence of the specific application. Especially, a so-called ONO-dielectric layer renders a solution to charging according to the invention.

According to a first aspect of the invention it is provided a capacitive micromachined ultrasound transducer, comprising a silicon substrate; a cavity; a first electrode, which is arranged between the silicon substrate and the cavity; wherein the first electrode is arranged under the cavity; a membrane, wherein the membrane is arranged above the cavity and opposite to the first electrode; a second electrode, wherein the second electrode is arranged above the cavity and opposite to the first electrode; wherein the second electrode is arranged in or close to the membrane, wherein the first electrode and the second electrode are adapted to be supplied by a voltage; and a first isolation layer, which is arranged between the first electrode and the second electrode, wherein the first isolation layer comprises a dielectric.

The main essence of the invention is to prevent charging. Charging is possible if the dielectric layers used can and will trap charges. The invention is targeted in preventing charge trapping by adding additional layers.

According to the invention the membrane of a capacitive micromachined transducer will be activated by a voltage. Usually, a voltage with a higher frequency is used, especially a RF voltage plus DC bias. This voltage is supplied to a number of electrodes. Typically, there are two electrodes. But it is also possible to use a higher number of electrodes. The problem of charging is caused by charge carriers, which are leaving one of the electrodes. These charge carriers are trying to arrive at another electrode of different potential. In case the electrodes will leave their electrodes the characteristics of the transducer can change. There will be a drift of the characteristics of the transducer. Therefore, the leaving of charge carriers has to be prevented in order to prevent charging. According to the invention a barrier for the leaving charge carriers is arranged in such a way that the path of the charge carriers is disconnected or at least the number of leaving charge carriers is reduced with respect to the situation without barrier. According to the invention the barrier is arranged e.g. between the electrodes. Further, the barrier can consist of only one barrier or of a number of barriers, which are arranged spatially advantageously.

A capacitive micromachined transducer comprises a cavity, wherein the cavity is a vacuum cavity or has a low pressure. The dimensions of the cavity are chosen in such a way that ultrasound vibrations lead to deformations of the membrane on top of the cavity and thus lead to deformations of the cavity and thus to a change in capacitance value. According to the invention there is an electrode, which will be deformed analogue with the membrane. Advantageously, the electrode is arranged in the neighbourhood or within the membrane. The deformations of the electrode due to ultrasound vibrations lead to a change of the voltage or current, which is supplied to the electrode. These changes can be detected by an electronic circuit. In this case the transducer is acting as a receiver. A change of the voltage or the current, respectively can also generate a deformation of membrane, which results in ultrasound vibrations. In this case the transducer is acting as a sender/transmitter.

According to the invention there is an isolation layer, which acts as a barrier for preventing or reducing the flow of charge carriers between the electrodes. Typically, the isolation layer is arranged between the electrodes. But it is only necessary to arrange the isolation layer in such a way, that the flow of charge carriers will be reduced or stopped. Therefore according to the invention, it is also possible to arrange the isolation layer in such a way that the isolation layer is not arranged between the electrodes in case the path of charge carriers will be blocked.

The transducer is built up on a silicon substrate, wherein the silicon substrate or silicon-on-insulator (SOI) substrate is used as a base plate.

The layers comprising oxides can be $SiO_2$ layers, deposited by LPCVD, MOCVD or PECVD. The layers comprising nitride can be $Si_3N_4$ layers, deposited by LPCVD, MOCVD or PECVD.

According to a second aspect of the invention it is provided a system for generating or measuring ultrasound waves, wherein the system comprises a transducer according to one of the claims 1 to 12.

According to the invention the system can use a transducer as a receiver or a sender of ultrasound waves. Especially, the system can be used for medical uses. The system can comprise means for detecting ultrasound vibrations, especially an electronic circuit. The electronic circuit can comprise a constant voltage source or a constant current source. The changes of the membrane will be detected according to the first alternative by a change of the current and according to the second alternative by a change of the voltage. The detected ultrasound vibrations can be depicted with the help of a personal computer. The personal computer can be used to control the procedure of detection. The system can comprise means for transmitting ultrasound waves.

According to a third aspect of the invention it is provided a method for manufacturing a transducer according to the invention, wherein the transducer is manufactured with the help of a CMOS manufacturing process, wherein the transducer can be manufactured as a post-processing feature during a CMOS process. According to the invention the transducer is CMOS compatible and can be used as a CMOS postprocessing option to provide additional functionality to the CMOS process. According to the invention the transducer can alternatively be added to a CMOS wafer using a flip-chip process or a substrate transfer process.

Further embodiments are incorporated in the dependent claims.

According to the present invention it is provided a transducer, wherein the transducer comprises a second isolation layer, wherein the second isolation layer is arranged between the second electrode and the cavity, wherein the first isolation layer is arranged between the first electrode and the cavity, wherein the second isolation layer comprises a dielectric.

According to the invention it is useful to keep the charge carriers at their corresponding electrode. Therefore, it is proposed to arrange adjacent to every electrode a barrier, realised by a dielectric layer. Such an arrangement prevents the flow of charge carriers as far as possible. Another aspect of the invention is the capsulation of an electrode by a dielectric layer. Such an arrangement would also prevent the bypassing of barriers by the charge carriers.

According to the invention an oxide layer is arranged in combination with a nitride layer in order to prevent charging because of hole tunneling. Hole tunneling of charge carriers through a nitride layer is possible in case there is a sufficient bias applied to the nitride layer, although the nitride layer is not electroconductive. Therefore, an additional oxide layer is used to prevent a flow of charge carriers because of hole tunneling through a nitride layer.

According to an exemplary embodiment it is provided a transducer, wherein the first isolation layer comprises a first sublayer, wherein the first sublayer comprises an oxide. Oxide is not electroconductive. Therefore, oxide can be used e.g. as a dielectric substance in order to prevent charge carriers from leaving their electrode.

According to another exemplary embodiment it is provided a transducer, wherein the dielectric is a higher-k layer such as a layer comprising nitride, aluminium oxide or hafnium oxide.

According to an exemplary embodiment it is provided a transducer, wherein the first isolation layer comprises a first sublayer, wherein the first sublayer has a thickness of at least 5 nm.

According to the invention the isolation layer is formed in such a way that the isolation layer prevents the effect of tunnelling of charge carriers. The effect of tunnelling can be prevented by a minimum thickness of the isolation layer. This minimum thickness of the isolation layer is a thickness of at least 5 nm. Therefore, the isolation layer has a minimum thickness of at least 5 nm.

According to another exemplary embodiment it is provided a transducer, wherein the first isolation layer comprises a first sublayer, which comprises an oxide, and a second sublayer, which comprises a nitride.

According to an exemplary embodiment it is provided a transducer, wherein the first isolation layer comprises a first sublayer, which comprises an oxide, a second sublayer, which comprises a nitride, and a third sublayer, which comprises an oxide.

According to an exemplary embodiment it is provided a transducer, wherein the first isolation layer comprises a first sublayer, which comprises a metal, a second sublayer, which comprises an oxide, and a third sublayer, which comprises a nitride.

According to another exemplary embodiment it is provided a transducer, wherein the second sublayer is arranged between the first sublayer and the third sublayer.

According to another exemplary embodiment it is provided a transducer, wherein the cavity is a vacuum cavity. Vacuum means not only a total vacuum, but also a low pressure, especially a pressure below 1 atm.

According to an exemplary embodiment it is provided a transducer, wherein the second electrode is embedded in the membrane.

According to an exemplary embodiment it is provided a transducer, wherein the transducer is at least one transducer type out of a group of transducer types, wherein the group of transducer types consists of a collapsed transducer type, a pre-collapsed transducer type, a flex transducer type and a combination of these types. The preferred mode of operation is (pre-)collapsed, when the membrane is partially collapsed to the bottom of the cavity. This mode of operation results in more output for a better receive sensitivity. However, this mode of operation is more vulnerable to charging.

According to an exemplary embodiment it is provided a system, wherein the system comprises a linear array or a two-dimensional array of transducers according to one of the inventive transducers.

It may be seen as a main essence of the present invention to prevent the charging of transducers. The prevention of charging results in stable characteristics of the transducer. The charging is prevented or at least reduced by arrangement of at least one barrier. This barrier can be realised by an additional dielectric layer. The barrier is arranged in the path of charge carriers in order to interrupt the flow of charge carriers starting from one electrode and heading to a target electrode.

It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF THE INVENTION

Figure 1:
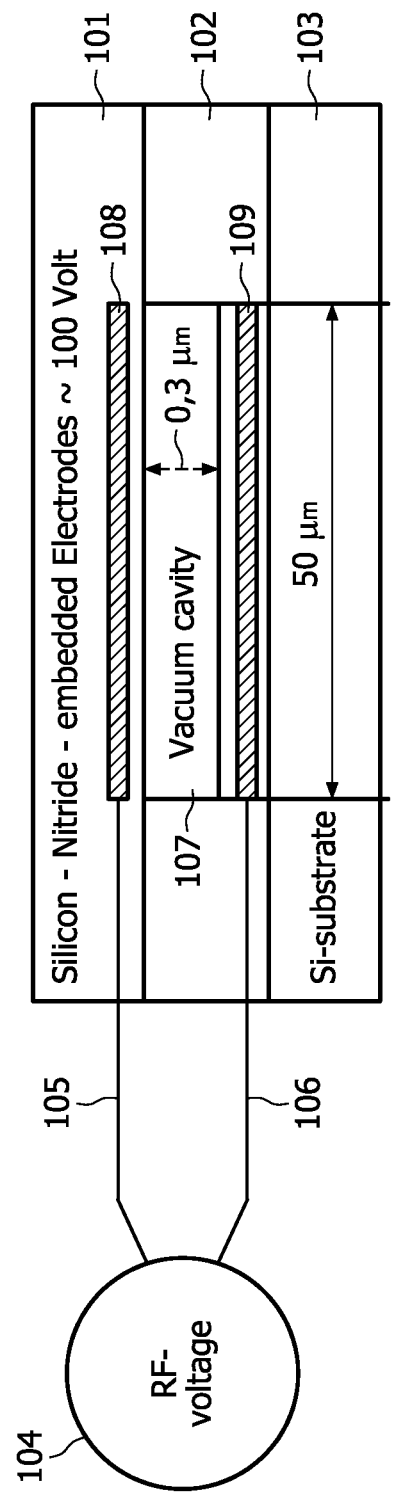
FIG. 1. shows the cross section of a capacitive micromachined ultrasound transducer in order to depict the basic principle.

The transducer can be manufactured by a CMOS compatible processing, wherein low temperature is used. The process is carried out with low temperature, because CMOS compatibility requires temperatures below 400° C. Firstly, with the help of a sacrificial etch of Al or poly/XeF2 etch a vacuum cavity is created. Secondly, within a PECVD silicon nitride a membrane is manufactured by inserting aluminum for use as electrode. PECVD nitride dielectric layers are used, because they have a high dielectric constant $\in \sim 7$ and good mechanical properties (E~250 MPa).

Controlling charging is key problem for good and stable capacitive micromachined ultrasound transducer operation. Charging means the trapping of carriers in the dielectric layer and a dramatic change of the associated electric field in the dielectric layer. As a result, the properties of a capacitive micormachined ultrasound transducer will change (electric fields will be strongly affected). This effects output pressure, which is very undesired.

The transducers according to the invention meet all important device parameters, such as the center frequency (2-20 Mhz), excellent bandwidth (>100%), very high maximum ultrasound output pressure (>3 MPa), good stability (0.2% over 40 hours) and lifetime (>>100 hours in water).

There are different possibilities to isolate the two electrodes. One possibility is a layer, which consists of nitride only. The disadvantage of such an isolation layer is the fact that it heavily charges, especially low temperature process nitride layers and it suffers from pinholes. A second possibility is an isolation layer comprising an oxide-nitride combination. Such a layer prevents electrical charge to reach nitride, because it increases the barrier for hole tunneling, which is a known source for charging nitride layers. In addition, oxide nitride layers cover pinholes. Another possibility according the inventive concept is an ONO configuration. The advantage of an ONO arrangement can be summarised by the fact that charging will be prevented sufficiently in a CMUT device. This effect is based on an oxide layer, which has a minimum thickness of 5 nm. Oxide is a good isolator, preventing hole tunneling and thus charging of the nitride layer. It is important to choose parameters like thickness of the oxide adequately. Minimum oxide thickness is required in order to increase tunneling barrier, which is typically thicker than 5 nm. Further advantages of an ONO arrangements of layers is the fact that the ONO arrangement can be implemented easily in CMOS process. An infringement is easily detected, because an ONO arrangement can be recognized easily. The disadvantage of such an ONO arrangement is the fact that the dielectric constant is decreasing.

Another embodiment according the invention is a capacitive micromachined transducer (CMUT) with an ON dielectric on both electrodes in order to isolate the electrodes from one another. It is also possible to use layers comprising aluminum oxide or hafnium oxide. Aluminium oxide or hafnium oxide have the advantage of a high epsilon. However, these materials are not CMOS compatible yet. Further, oxide only has a worse epsilon and has bad membrane properties.

FIG. 1 shows the cross section of an arrangement of a capacitive micromachined ultrasound transducer. It is depicted the general arrangement of a capacitive micromachined ultrasound transducer. There is a first layer 101, which comprises silicon nitride or nitride, respectively. This layer has a width of roundabout 1 µm. In this layer it is embedded an electrode 108, which is dimensioned for a voltage of about 100 Volt. There is a second layer 102, which comprises a vacuum cavity 107 and a further electrode 109. The vacuum cavity is manufactured by sacrifical etching. The vacuum cavity 107 has a height of about 0.3 µm. The electrode 108 and the further electrode 109 will be supplied by a RF voltage. The electrode 108 is connected with a wire 105 to the RF voltage source and the electrode 109 is connected via the wire 106 to the RF voltage source.

The electrodes 108, 109 will be attracted by each other due to the supply of the voltage by the RF-voltage source 104 and DC bias. As a result thereof there is an oscillation of the layers 101, 102, in which the electrodes are embedded. A capacitive micromachined ultrasound transducer can also be used as a sensor. Receiving pressure waves lead to vibrations of the layers 101, 102, which are adjacent to the vacuum cavity 107. These vibrations result in changes of the capacitance between the electrode 108 and the further electrode 109. The changes of capacitance can be detected for example with the help of changes of a current, if the arrangement is supplied by a constant voltage.

Figure 2:
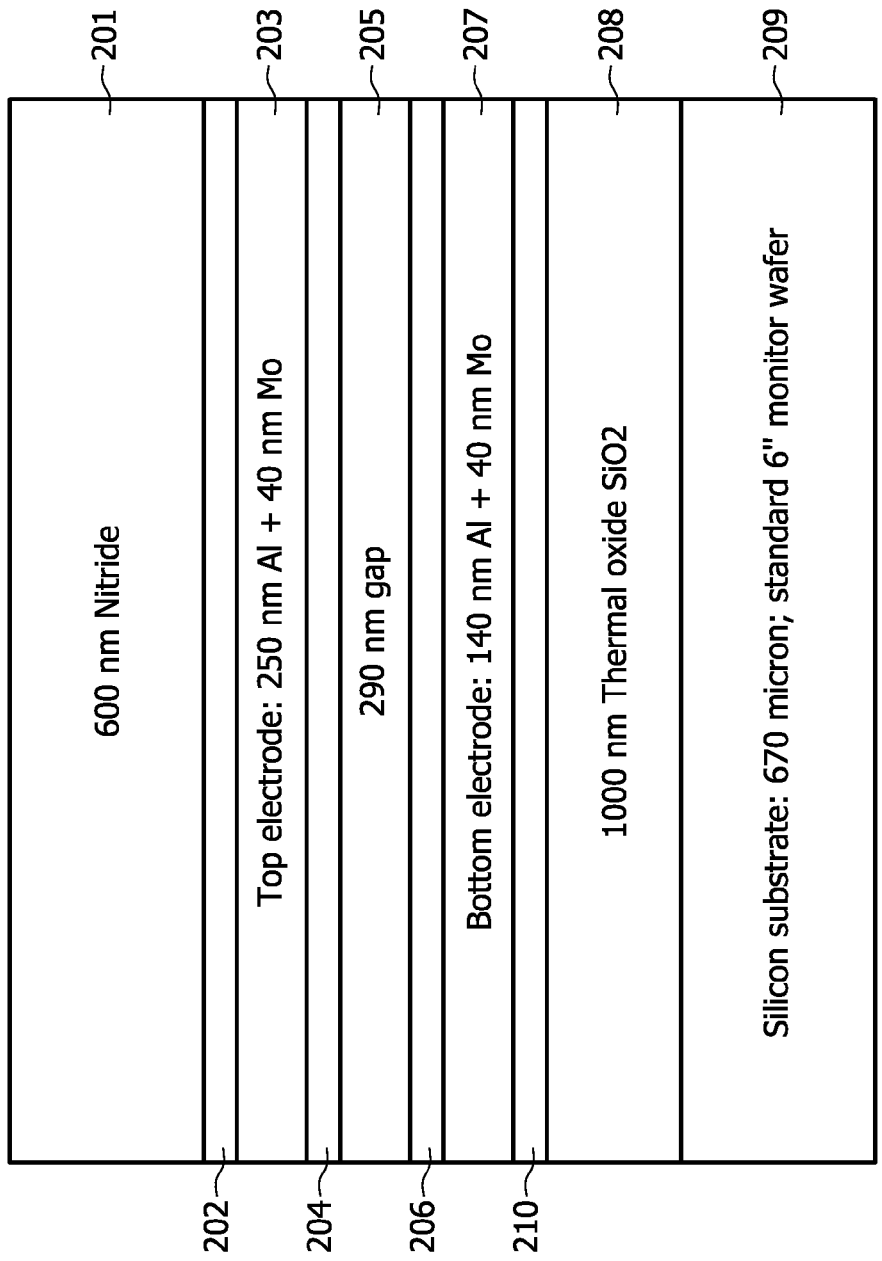
FIG. 2. depicts the cross section of an arrangement of an ONO-capacitive micromachined ultrasound transducer.

FIG. 2 shows a cross section of a capacitive micromachined ultrasound transducer according to the invention. It is depicted a electrode 203 (top electrode) and a further electrode 207 (bottom electrode), which are separated by a gap 205, e.g. a vacuum cavity. According to the invention there are two ONO layers 204, 206, a first one between the electrode 203 and the gap 205 and a second one between the further electrode 207 and the gap 205. These ONO layers 204, 206 lead to the effect that there is no charging because of complete isolation of the two electrodes 203, 207 from one another. The ONO layers 204, 206 comprise three sublayers, wherein there are two oxide sublayers with a thickness of e.g. 40 nm and one nitride sublayer with a thickness of e.g. 150 nm. Typically, the nitride sublayer is arranged between the two oxide sublayers. The gap 205 is formed by a sacrifical etch of e.g. 250 nm aluminium and 40 nm molybdenum, which creates a resulting gap of 290 nm. The further electrode 207, the bottom electrode, comprises e.g. a 140 nm thick sublayer of aluminium and a 40 nm thick sublayer of molybdenum. Under the further electrode 207 there is typically a nitride layer 210, which has a thickness of 100 nm. Under the nitride layer 210 there is a thermal oxide $SiO_2$ layer 208 with a height of 1000 nm. Under the thermal oxide layer 208 there is silicon substrate 209 with 670 micron of e.g. a standard 6" monitor wafer. The silicon substrate 209 is used as a base plate. The electrode 203 comprises a sublayer of aluminium with a thickness of 250 nm and a sublayer of molybdenum with a thickness of 40 nm. Above the electrode 203 there is a oxide nitride layer 202, wherein the oxide sublayer has a height of 20 nm and the nitride layer has a height of 200 nm. Above this oxide nitride layer 202 there is a nitride layer 201, which has a height of 600 nm.

Figure 3:
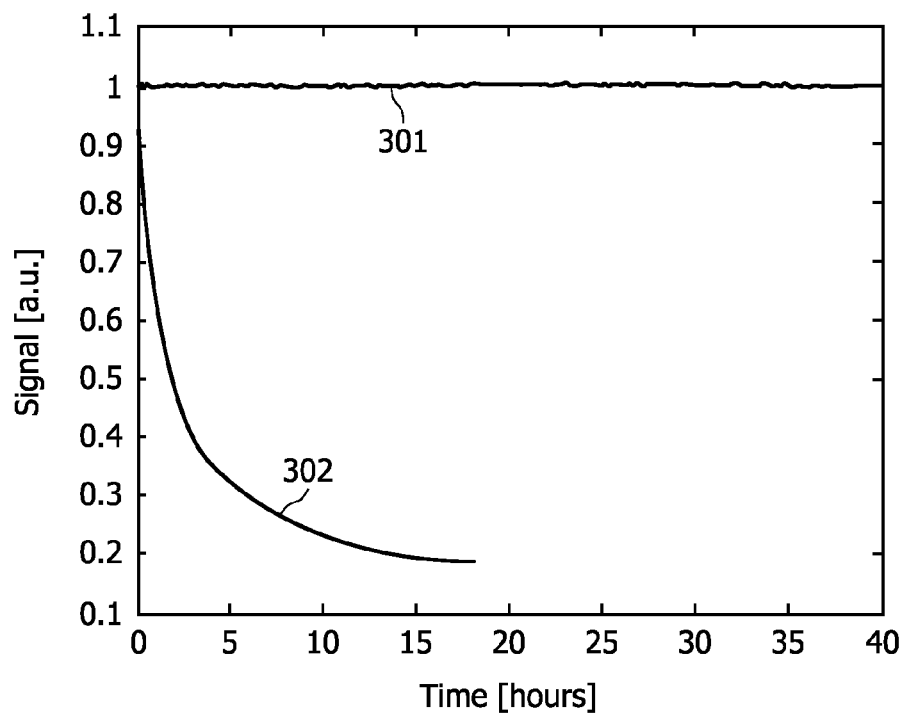
FIG. 3. shows the measurement results of signals of different capacitive micromachined ultrasound transducer.

FIG. 3 shows the change of signal during time. The curve 301 corresponds to a capacitive micromachined ultrasound transducer according to the invention. The curve 302 corresponds to a capacitive micromachined ultrasound transducer according to the prior art. The measurement results 302 changes during time due to the change of characteristics because of charging. The signal is decreasing during time, whereby the possibility to use a capacitive micromachined ultrasound transducer diminishes. In contrary to the run of curve 302 the curve 301 does not change significantly during time. Therefore, the usability of the capacitive micromachined ultrasound transducer according to the invention will not be restricted during time.

Figure 4:
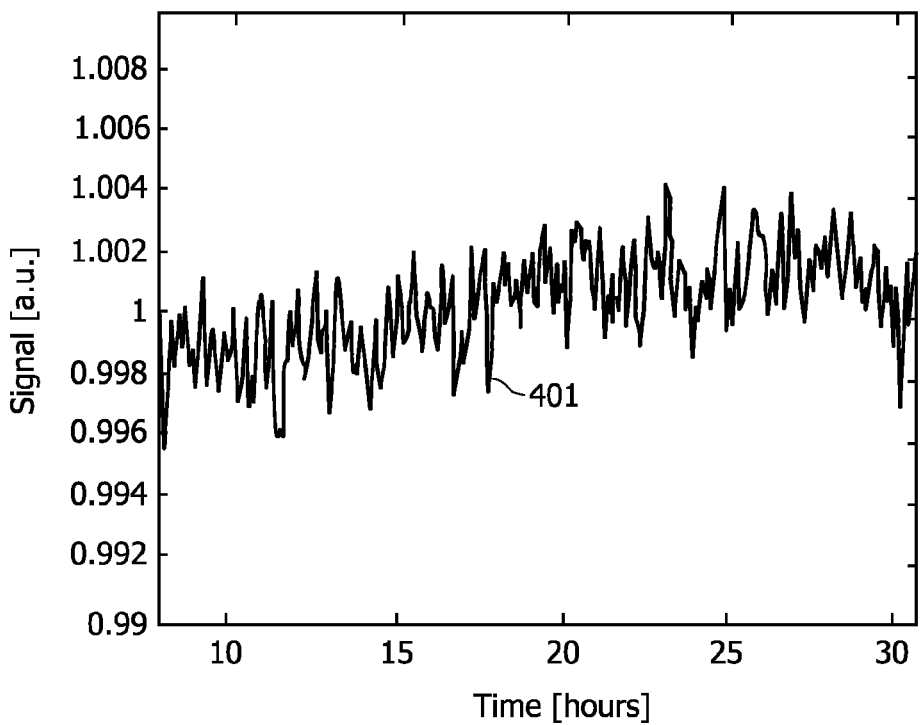
FIG. 4. shows the measurement results of the signal of a capacitive micromachined ultrasound transducer according to the inventive concept.

FIG. 4 shows the measurement results 401 of a capacitive micromachined ultrasound transducer according to the invention in enlarged dimensions compared with the run of curve 301 of FIG. 3. It can be recognised that there is only typical oscillations but no continuous trend of the curve 401. Therefore, the charging appears to be prevented.

It should be noted that the invention may be applied to medical ultrasound transducers (traditional, curved or matrix transducers, catheters), airborn ultrasound for presence detection, pressure sensors, $CO_2$ sensor (based on ultrasound) for capnography or air controle in buildings, liquid level and liquid quality sensors and fingerprint recognition sensors.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims.

LIST OF REFERENCE SIGNS 101 layer comprising silicon nitride,
102 layer comprising a vacuum cavity,
103 silicon substrate,
104 RF-voltage source,
105 wire for supplying RF voltage,
106 wire for supplying RF voltage,
107 vacuum cavity,
108 electrode,
109 electrode,
201 layer comprising nitride,
202 layer comprising oxide and nitride,
203 top electrode,
204 layer comprising an oxide sublayer, a nitride sublayer and an additional oxide sublayer,
205 gap,
206 layer comprising an oxide sublayer, a nitride sublayer and an additional oxide sublayer,
207 bottom electrode,
208 layer comprising thermal oxide,
209 silicon substrate,
210 layer comprising nitride,
301 measurement results,
302 measurement results,
401 measurement results.

The invention claimed is:

1. A capacitive micromachined ultrasound transducer, comprising:
   a silicon substrate;
   a cavity;
   a first electrode, which is arranged between the silicon substrate and the cavity; wherein the first electrode is arranged under the cavity; a membrane, wherein the membrane is arranged above the cavity and opposite to the first electrode;
   a second electrode, wherein the second electrode is arranged above the cavity and opposite to the first electrode;
   wherein the second electrode is arranged in or close to the membrane, wherein the first electrode and the second electrode are adapted to be supplied by a voltage;
   a first isolation layer, which is arranged between the first electrode and the second electrode, wherein the first isolation layer further comprises a first sublayer which comprises an oxide, and a second sublayer which comprises a nitride, and
   a second isolation layer, wherein the second isolation layer is arranged between the second electrode and the cavity, wherein the first isolation layer is arranged between the first electrode and the cavity, wherein the second isolation layer comprises a dielectric.

2. The transducer according to claim 1, wherein the dielectric is a higher-k layer comprising nitride, aluminium oxide or hafnium oxide or an ONO layer.

3. The transducer according to claim 1, wherein the cavity has a pressure below 1 atm.

4. The transducer according to claim 1, wherein the second electrode is embedded in the membrane.

5. The transducer according to claim 1, wherein the transducer is at least one transducer type out of a group of transducer types, wherein the group of transducer types consists of a collapsed transducer type, a pre-collapsed transducer type, a flex transducer type and a combination of these types.

6. A system for generating or detecting ultrasound waves, wherein the system comprises a transducer according to claim 1.

7. The system according to claim 6, wherein the system further comprises a linear array or a two-dimensional array of transducers.

8. A method for manufacturing a transducer according to claim 1, comprising the steps of:
   building the transducer on a silicon substrate;
   providing the transducer with a first and a second electrode arranged on either side of a cavity;
   maintaining the temperature of the process used to manufacture the transducer below 400° C.; and
   arranging at least one isolation layer, comprising at least an oxide sublayer and a nitride sublayer, between the first and second electrodes.

9. A method for manufacturing a transducer according to claim 1, further comprising the step of: manufacturing the transducer as a post-processing feature during a CMOS process.

10. The transducer according to claim 1, wherein the first isolation layer further comprises a third sublayer which comprises an oxide.

11. The transducer according to claim 1, further comprising a third sublayer comprising oxide, wherein the second sublayer is arranged between the first sublayer and the third sublayer.

12. The transducer according to claim 1, wherein the oxide comprises an oxide thickness of at least 5 nm.

13. The transducer according to claim 3, wherein the cavity further comprises a vacuum cavity.

14. The transducer according to claim 1 wherein the first isolation layer comprises at least one of $SiO_2$ or $Si_3N_4$.

15. The transducer according to claim 1, wherein the dielectric comprises aluminum oxide or hafnium oxide.

* * * * *